April 26, 1966 R. S. ROTHSCHILD 3,248,642

PRECISION VOLTAGE SOURCE

Filed May 22, 1962

INVENTOR.
RAYMOND S. ROTHSCHILD
BY James and Franklin
ATTORNEYS 3,248,642
PRECISION VOLTAGE SOURCE
Raymond S. Rothschild, 62—59 108th St., Forest Hills 75, N.Y.
Filed May 22, 1962, Ser. No. 196,634
5 Claims. (Cl. 323—21)

The present invention relates to an arrangement for maintaining the voltage output of an amplifier at a substantially constant level despite variations in the characteristics of the components of the amplifying system or variations in the input signal thereto.

Many circuit arrangements have been proposed in the past for maintaining the voltage output of an amplifier substantially constant by sensing the voltage output and feeding back to the amplifier a control signal related to the voltage output, said control signal modifying the action of the amplifier in an appropriate fashion when the output departs from a nominal value. Usually this is accomplished by varying the amplification of the amplifier, as by appropriately changing the bias of one of the amplifying elements, such as a tube or transistor. Such circuit arrangements are more or less complicated, depending upon the precision desired, and the control effect is more or less dependent upon the characteristics of the electrical components involved. If, because of ambient conditions, a given circuit element such as a tube or resistor should change its operating characteristics, the output of the system may change accordingly unless some compensating, and complicating, circuitry is employed.

The present invention has for its prime object the provision of simple circuitry, utilizing sturdy and reliable circuit components, which will accurately maintain the output voltage at a desired value over wide ranges of variation in the input or signal voltage and despite changes in the operating characteristics of the circuit elements such as might be induced by variations in ambient conditions, e.g., temperature. To this end the magnitude of the output voltage is sensed by means of a Zener diode or other comparable circuit element having the characteristic of being substantially non-conductive when the voltage thereacross is below a predetermined value and being highly conductive when the voltage thereacross reaches or exceeds that predetermined value. The circuit arrangement is such that the "breakdown" or conducting voltage of the Zener diode constitutes the major factor in controlling the output voltage and maintaining it at desired value, the system being so designed as to inherently compensate for any changes in the operating characteristics of practically all of the circuit elements other than the Zener diode. The breakdown characteristics of the Zener diode are extremely stable, particularly when the diode is placed in a temperature-controlled enclosure, as may very conveniently be done.

The system operates on the principle of controlling the output by modifying the proportion of the input signal which is applied to the amplifier in accordance with the sensed magnitude of the amplifier output. The sensing of the amplifier output is accomplished by the Zener diode, that diode passing current only during those times when the amplifier output exceeds its predetermined value. Thus, when the amplifier output is alternating in character, the Zener diode will fire only at the peaks of the output voltage, only when those peaks exceed the breakdown voltage of the diode, and for a period of time determined by the amount that the output voltage exceeds that predetermined value. This has the significant advantage that the A.C. output voltage is sensed directly for control purposes, and need not first be converted to a D.C. equivalent.

The firing of the Zener diode in turn controls the output of an amplifier, hereinafter termed the control amplifier, that output being used to energize a light source. The input signal to the main amplifier is applied across a voltage divider network one portion of which comprises a resistance element the resistance of which varies with the amount of light impinging thereon, that resistance element being illuminated by the light source energized by the control amplifier. The combination of light source and light-sensitive resistance element serves to integrate the discrete conductive pulses passed by the Zener diode, and to reduce the proportion of the signal which is applied to the main amplifier in accordance therewith. Thus the voltage output will be maintained substantially constant with variations in the signal input, and will also remain substantially constant if the characteristics of almost any of the circuit elements other than the Zener diode vary. Because of the essential stability of the Zener diode, the overall result in constancy and reliability is highly favorable.

To the accomplishment of the above, and to such other objects as may hereinafter appear, the present invention relates to the precision voltage source system as defined in the appended claims, and as described in this specification, taken together with the accompanying drawings, in which:

Figure 1:
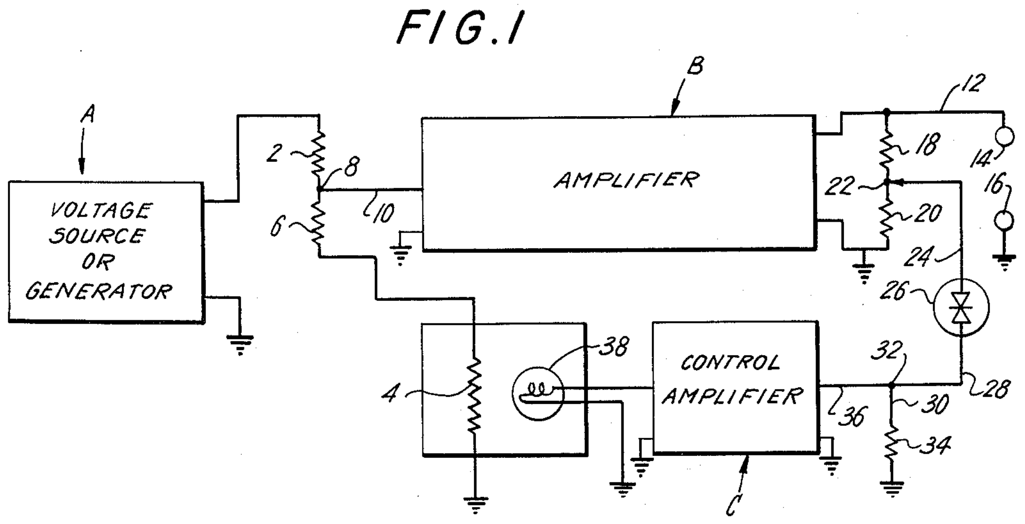
FIG. 1 is a circuit block diagram of one embodiment of the system of the present invention.

Since the precise internal circuitry of the various elements of the system here disclosed may vary widely, depending upon the particular application to which the system may be put, the system is here illustrated with the conventional portions thereof shown in block diagram form, as will readily be understood.

The subsystem generally designated A represents the source from which the signal voltage is derived, which signal voltage is to be amplified to a value which is to be held constant. It may comprise a generator, an oscillator, or any other voltage source, preferably of the A.C. type. The voltage output from the source A, hereinafter termed the "signal voltage," is applied across a voltage divider network comprising the impedance elements (preferably resistors) 2 and 4, with a third impedance element 6 interposed between the lower end of the element 2 and the upper end of the element 4. The impedance elements 2 and 6 are essentially conventional in nature. The impedance element 4, however, has the characteristic that its impedance (resistance) varies in accordance with the amount of light impinging thereupon. Resistances having this characteristic are known as such, and are commercially available.

The point 8 between the impedance elements 2 and 6 is connected by lead 10 to the subsystem generally designated B, which comprises an amplifier of any desired design. The amplifier B senses the voltage signal applied across the impedance elements 4 and 6 and amplifies that signal, the amplifier output being applied via lead 12 across terminals 14 and 16, the terminal 14 being connected to the lead 12 and the terminal 16 being connected to ground. The output from the amplifier B is also applied across the voltage divider network defined by the resistors 18 and 20. The point 22 between the resistors 18 and 20 is connected by lead 24 to one end of circuit element 26, that element having the characteristic of being substantially non-conductive when the voltage thereacross is less than a predetermined amount, and being highly conductive when the voltage thereacross reaches or exceeds that predetermined amount. A Zener diode is a particularly effective element of this character, largely because of its extremely stable characteristics even when subjected to wide ambient temperature variations. The opposite end of the Zener diode 26 is connected to ground via leads 28 and 30, connected to one another at point 32, and resistor 34. The Zener diode 26 is here disclosed as of the double-ended type, capable of conducting in either direction, depending upon the direction of the voltage applied thereacross. This is a preferred arrangement, since it provides double the A.C. control that a single ended diode 26 would provide, but a single ended diode 26 could be employed if desired, although with some sacrifice in operating characteristics of the system.

The output voltage at which the Zener diode 26 will conduct is determined by the characteristics of the diode 26 itself, and by the relative magnitudes of the resistors 18 and 20. Hence, for a given diode 26, the value of voltage output which is to be maintained may be varied by moving the point 22 downwardly or upwardly, changing the relative values of the resistors 18 and 20.

A control amplifier generally designated C is connected by lead 36 to the point 32, the lead 36 controlling the output of the control amplifier C in any appropriate manner, as by varying the bias on a tube or transistor control element. The output of the control amplifier C is fed to, and energizes, light source 38, which is so located as to illuminate the impedance element 4 and thereby control its impedance (resistance).

The operation of the system is substantially as follows. So long as the output of the amplifier B does not exceed a predetermined value, which value is determined by the relative magnitudes of the resistance 18 and 20 and the breakdown characteristics of the Zener diode 26, the Zener diode 26 will not conduct and the output of the control amplifier C will be at a nominal value (zero or predetermined), thus causing a nominal amount of light to impinge upon the impedance element 4. This in turn controls the impedance division as between the impedance element 2 on the one hand and the impedance elements 4 and 6 on the other hand, thus causing a predetermined proportion of the voltage output from the voltage source A to be applied to the amplifier B.

Figure 2:
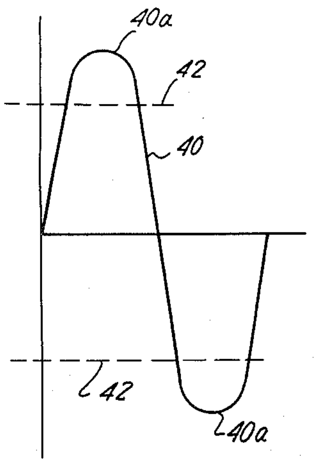
FIG. 2 is a graphical representation of a typical voltage output, illustrating the manner in which the Zener diode functions.

Let us now consider that the maximum voltage output from the amplifier B exceeds that predetermined value. Having reference to FIG. 2, where the voltage output is graphically represented by the line 40, it will be seen that the peaks 40*a* of that voltage output pass beyond the breakdown point of the Zener diode 26, that breakdown point being represented by the horizontal lines 42. This will result in a voltage input to the control amplifier C which is graphically represented in FIG. 3 by the lines 40*b*. The more the maximum output of the amplifier B exceeds the breakdown voltage of the diode 26, the larger will be the area under the curves 40*b*, and hence the greater will be the output of the control amplifier C. As a result, the light source 38 will be correspondingly increasingly energized, and will produce more light which impinges upon the light-sensitive impedance element 4. The impedance (resistance) of that element 4 will decrease, and hence a lesser proportion of the signal from the voltage source A will be applied to the main amplifier B. This will result in a reduction in the magnitude of the output voltage from the amplifier B.

Figure 3:
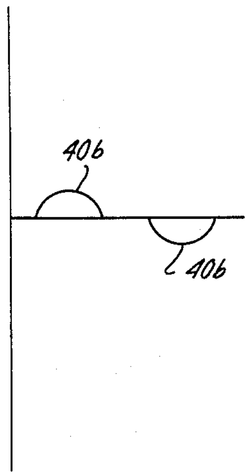
FIG. 3 is a graphical representation of the voltage input to the control amplifier.

The nature of the operation of the light source 38 and the light-sensitive impedance element 4 is such as to relatively smoothly modulate the signal actually applied to the main amplifier B in an integrated fashion, despite the fact that the input to the control amplifier C is in the form of discrete voltage pulses such as are represented by the curves 40*b* in FIG. 3.

The net result of the overall system is to produce a substantially constant voltage at the input of the main amplifier B despite variations in the initial signal emanating from the voltage source A, and to maintain the output of the amplifier B constant even though the gain of the main amplifier B, or the control amplifier C, or the characteristics of the light source 38 and the light-sensitive impedance element 4 may vary. Indeed, only the characteristics of the resistors 18, 20 and the diode 26 itself will significantly affect the accuracy of the precision voltage source, and these circuit elements may be so selected and mounted as to greatly minimize possibility of error.

When, as is here disclosed, the system is used in connection with alternating voltages, all of the amplifiers are of the A.C. type, so that an exceptionally rapid time response is achieved. Also, the A.C. output is directly active to control the operation of the parts C, 38 and 4, and need not be first converted to an equivalent D.C. value.

While but a single embodiment of the present invention is here specifically disclosed, it will be apparent that many variations may be made in the details thereof, all within the scope of the instant invention as defined in the following claims.

I claim:

1. A precision voltage source comprising a signal circuit, a first amplifier having an input and an A.C. output, an input-signal-modifying circuit means connected between said signal circuit and said input and comprising an impedance whose value varies in accordance with the light impinging thereon and thereby varies the proportion of the signal fed to said input, light means operatively associated with said impedance, and control means operatively connected between said output and said light means for energizing the latter in accordance with the magnitude of said output, said control means comprising an amplifier having a control element connected to said output via a circuit part which conducts only when the voltage of said output exceeds a predetermined value.

2. The precision voltage source of claim 1, in which said circuit part conducts in either direction when said output voltage exceeds said predetermined value, the direction of conduction depending on the direction of said output voltage.

3. The precision voltage source of claim 1, in which said circuit part is connected in series with an impedance, and said control element is electrically connected to a point between said part and said impedance.

4. The precision voltage source of claim 3, in which said circuit part conducts in either direction when said output voltage exceeds said predetermined value, the direction of conduction depending on the direction of said output voltage.

5. The precision voltage source of claim 1, in which said circuit part comprises a Zener diode which conducts only when the voltage of said output exceeds a predetermined value.

References Cited by the Examiner

UNITED STATES PATENTS

| | | | |
|---|---|---|---|
| 2,984,779 | 5/1961 | Klees | 317—148.5 X |
| 2,984,780 | 5/1961 | Kolelsky | 323—66 |
| 3,020,488 | 2/1962 | Miranda et al. | 330—59 |
| 3,040,241 | 6/1962 | Wunderman | 323—66 |
| 3,070,743 | 12/1962 | Harper | 323—66 |
| 3,082,381 | 3/1963 | Morrill et al. | 330—59 |

OTHER REFERENCES

Electronic Design, May 27, 1959, p. 46.

MILTON O. HIRSHFIELD, *Primary Examiner.*

LLOYD McCOLLUM, *Examiner.*